United States Patent Office 3,485,916
Patented Dec. 23, 1969

3,485,916
COMPOSITIONS AND METHODS EMPLOYING INSECTICIDAL ESTERS OF CHRYSANTHE-MUMIC ACID
John L. Neumeyer, Wayland, Mass., and Harry H. Incho, Medina, N.Y., assignors to FMC Corporation, New York, N.Y., a corporation of Delaware
No Drawing. Continuation-in-part of application Ser. No. 342,268, Feb. 3, 1964. This application Sept. 14, 1965, Ser. No. 487,307
Int. Cl. A01n 9/22
U.S. Cl. 424—186
12 Claims

ABSTRACT OF THE DISCLOSURE

Insecticidal compositions are described which comprise combinations of insecticidal esters of chrysanthemumic acid, e.g. pyrethrins, allethrin, and related compounds, with a new class of synergists, N-(omega-alkynyl)phthalimides. The preparation and properties of these synergists is given and synergistic insecticidal activity is illustrated.

---

This application is a continuation-in-part of co-pending application Ser. No. 342,268, filed Feb. 3, 1964, now abandoned.

This invention relates to novel insecticidal compositions and in particular to insecticidal compositions containing pyrethrins, allethrin, or related insecticidal cyclopropane-carboxylic acid esters, in combination with certain novel synergists for insecticidal activity.

Among the most widely used insecticides today are the pyrethrins, the active principle of pyrethrum flowers (*Chrysanthemum cinerariaefolium*), which have a high order of insecticidal activity and a low mammalian toxicity. The relatively high cost and the uncertain supply of pyrethrins have encouraged attempts to prepare synthetic insecticides which retain the desirable properties of pyrethrins. It has long been known that synthetic products having a basic structural similarity to pyrethrins in that they are esters of 2,2-dimethyl-3-(2-methylpropenyl)cyclopropanecarboxylic acid, (which is also known as chrysanthemumic acid and will be so referred to herein), exhibit insecticidal activity of a significant order. However, these synthetic crysanthemumates are expensive and for the most part their degree of insecticidal activity is lower than that of pyrethrins.

The wide market which pyrethrins and related synthetic insecticides enjoy today is due primarily to the discovery of certain additives which enhance the activity of these insecticides. These additives, commonly called synergists, are agents which may or may not themselves exhibit insecticidal activity but which when combined with pyrethrins or related compounds produce new insecticides, having an effectiveness significantly greater than the sum of the effectiveness of the components when used separately. A great deal of time and effort has been devoted to the search for effective synergists. One of the most effective and most widely used of the pyrethrins synergists is the compound piperonyl butoxide (α-[2-(2-butoxyethoxy)ethoxy]-4,5-(methylenedioxy)-2-propyltoluene), which is described in synergistic combination with pyrethrins in Wachs U.S. Patent 2,550,737. Unfortunately, it has been found that many compounds which are excellent synergists for pyrethrins are not nearly as effective when used with allethrin or other synthetic cyclopropanecarboxylic acid esters. Despite intensive study and research the problem remains one of importance.

We have now discovered that certain chemical compounds of the class of N-(omega-alkynyl)phthalimides are effective synergists for the insecticidal activity of natural and synthetic esters of cyclopropanecarboxylic acids. These synergistic phthalimides have the general structural formula:

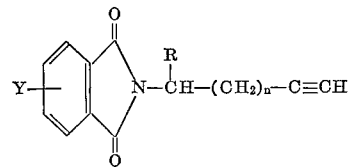

where $n$ amy be an integer of 2 to 8 inclusive, R may be hydrogen or methyl, and Y may be hydrogen or any substituent including halogen, lower alkyl, lower alkoxy, lower alkylthio, cyano, acyloxy, or alkoxycarbonyl. Among preferred compounds of this class are those wherein $n$ is 2, 3, or 4, R is hydrogen and Y is hydrogen or halogen.

Of the natural and synthetic esters of cyclopropanecarboxylic acids the best known members, preferred for use herein because of their general insecticidal activity and availability, are the esters of crysanthemumic acid, which have the general structure:

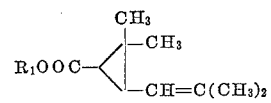

and wherein the radical $R_1$ can be any of the very large number of radicals which have been found to form insecticidal chrysanthemumates. For example, this class of esters includes the pyrethrins, allethrin (3-allyl-2-methyl-4-oxo-2-cyclopentenyl chrysanthemumate) and related insecticides as described by Schechter and La Forge in U.S. Patent 2,661,374; cyclethrin (3-(2-cyclopentenyl)-2-methyl-4-oxo-2-cyclopentenyl chrysanthemumate) as described by Guest and Stansbury in U.S. Patent 2,891,888; furethrin (3.-furfuryl-2-methyl-4-oxo-2-cyclopentenyl chrysanthemumate) as described in National Distillers Products British Patent 678,230; barthrin (6-chloropiperonyl chrysanthemumate) and its bromo analog, as described by Barthel et al. in U.S. Patent 2,886,485; dimethrin (2,4-dimethylbenzyl chrysanthemumate) and the 3,4-dimethyl isomer, as described by Barthel in U.S. Patent 2,857,309; compounds of the classes of (cyclohexene-1,2-dicarboximido)methyl chrysanthemumates as describe din Belgian Patent 646,399 and (cyclohexadiene-1,2-dicarboximido) methyl chrysanthemumates as described in Belgian Patent 651,737, both to the Sumitomo Chemical Company, Ltd.; and related compounds such as phthalimidoalkyl and substituted phthalimidoalkyl chrysanthemumates, as described in Sumitomo Belgian Patent 635,902. Other insecticidal esters of chrysanthemumic acid also form synergistic combinations with the phthalimides described herein.

The N-substituted phthalimides of this invention may be prepared from the corresponding phthalic acid derivatives, which may be substituted on the benzene nucleus as desired, employing known procedures for the synthesis of N-substituted phthalimides. For example, the appropriate phthalic anhydride, acid halide, or ester may be reacted with the desired alkynylamine; or the phthalimide or its salt may be reacted with an alkynyl halide, or the p-toluenesulfonic acid ester of an alkynyl alcohol; or the N-acetyl phthalimide may be reacted with an amine; or an N-(omega-haloalkyl)phthalimide may be reacted with sodium acetylide. The substitution on the benzene ring may be accomplished by standard procedures, either before or after completion of the N-substitution step, depending of course on the procedure used. For example, the halogenated derivatives are preferably prepared by starting with a halogenated phthalic acid, many of which are commercially available, or by halogenating the N-substituted phthalimide by known methods.

The preparation of the N-(omega-alkynyl)phthalimides described herein and their synergistic insecticidal properties are illustrated in the following examples, which are not intended to be limitative of the wide variety of procedures which are applicable to the synthesis of N-substituted phthalimides, or of the many insecticidal combinations in which they are effective. In these examples, all temperatures are in degrees centigrade.

EXAMPLE 1

N-(4-pentynyl)phthalimide was prepared as follows: A solution of 41 grams of 5-chloro-1-pentyne in 200 ml. of N,N - dimethylformamide was added dropwise to a solution of 75 g. of potassium phthalimide in 800 ml. of N,N-dimethylformamide at 100°. The mixture was stirred at 100° for one hour and at room temperature overnight, then poured into 1000 ml. of ice water. The precipitate was removed by filtration, washed with water and dried. Forty-five g. of crude product melting at 84–85° was obtained. Recrystallization from 35% ethanol-water gave 42 g. of N-(4-pentynyl)phthalimide melting at 85–86°.

*Analysis.*—Calc'd for $C_{13}H_{11}NO_2$: C, 73.22; H, 5.20. Found: C, 73.23; H, 5.45.

The synergistic activity of N-(4-pentynyl)phthalimide was determined by the following test procedure: One microliter of a solution of 30 mg. of allethrin and 2000 mg. of N-(4-pentynyl)phthalimide in 100 ml. of acetone was applied topically to each of a replicate of 35 to 45 three- to four-day old houseflies (*Musca domestica*). After twenty-four hours the mortality was determined by physical counting of the dead and living flies, and the percent kill was calculated. A control group was treated in a similar manner with a solution of 2000 mg. of N-(4-pentynyl)phthalimide in 100 ml. of acetone, omitting the allethrin. The above procedure was repeated at a reduced concentration of synergist, using a test solution containing 30 mg. of allethrin and 150 mg. of N-(4-pentynyl)phthalimide in 100 ml. of acetone. A test group of flies, employing 30 mg. of allethrin in 100 ml. of acetone and omitting the synergist, was run for comparison. Results are shown in Table 1:

TABLE 1.—COMPOSITIONS OF N-(4-PENTYNYL)PHTHALIMIDE AND ALLETHRIN

| Mg. Synergist | Mg. Allethrin | Mortality of houseflies, percent |
|---|---|---|
| 2,000 | 30 | 100 |
| 2,000 | None | 21 |
| 150 | 30 | 97 |
| 150 | None | 0 |
| None | 30 | 24 |

EXAMPLES 2 to 9

Following the test procedure described in Example 1, synergistic compositions of N-(4-pentynyl)phthalimide with a wide variety of chrysanthemumate esters were tested for activity against houseflies. Representative results are shown in Table 2:

TABLE 2.—COMPOSITIONS OF N-(4-PENTYNYL)PHTHALIMIDE AND CHRYSANTHEMUMATES

| Chrysanthemumate | Mg. | Mg. Synergist | Mortality of houseflies, percent |
|---|---|---|---|
| Cyclethrin | 22 | 110 | 97 |
|  | None | 150 | 0 |
|  | 24 | None | 9 |
| Furethrin | 22 | 110 | 96 |
|  | None | 150 | 0 |
|  | 48 | None | 14 |
| Pyrethrins | 9.6 | 48 | 48 |
|  | None | 150 | 0 |
|  | 18 | None | 9 |
| Barthrin | 22 | 110 | 96 |
|  | None | 150 | 0 |
|  | 50 | None | 9 |
| Dimethrin | 32 | 160 | 85 |
|  | None | 150 | 0 |
|  | 50 | None | 6 |
| 3-(o-Chlorobenzyl)-2-methyl-4-oxo-2-cyclopentyl chrysanthemumate. | 22 | 110 | 71 |
|  | None | 150 | 0 |
|  | 50 | None | 0 |
| (1-cyclohexene-1,2-dicarboximido)methyl chrysanthemumate. | 14.4 | 72 | 84 |
|  | None | 150 | 0 |
|  | 24 | None | 49 |
| 3,4-dimethylbenzyl chrysanthemumate. | 33 | 165 | 83 |
|  | None | 150 | 0 |
|  | 165 | None | 32 |

The results shown in Table 2 demonstrate the general nature of the synergistic interaction between a phthalimide of this invention and chrysanthemumates. Even at dosages as high as 2000 mg. this phthalimide itself was inactive, as shown in Example 1, yet a consistent and substantial synergistic effect is observed.

EXAMPLE 10

Synergistic activity was tested against the German cockroach (*Blatella germanica*) as follows: Adult, male roaches were completely immersed for about five seconds in test solutions consisting of N-(4-pentynyl)phthalimide and the indicated chrysanthemumate ester in 50% aqueous acetone. The roaches were then transferred to holding cages, and the mortality was determined after twenty-four and forty-eight hours. Five replicates of nineteen or twenty roaches each were run at each concentration. The results shown in Table 3 represent the averages of each set of five replicates.

TABLE 3.—COMPOSITIONS OF N-(4-PENTYNYL)PHTHALIMIDE AND CHRYSANTHEMUMATES

| Chrysanthemumate | Mg. | Mg. Synergist | Roaches dead and moribund, percent 24 hours | 48 hours |
|---|---|---|---|---|
| Allethrin | 10 | 100 | 73 | 74 |
|  | None | 100 | 9 | 10 |
|  | 10 | None | 6 | 8 |
| (1-cyclohexene-1,2-dicarboximido)methyl chrysanthemumate. | 10 | 100 | 63 | 73 |
|  | None | 100 | 9 | 10 |
|  | 10 | None | 0 | 1 |

The following examples illustrate the preparation of other representative members of this class of synergistic phthalimides, and their synergistic effect in combination with chrysanthemumates:

EXAMPLE 11

N-(5-Hexynyl)phthalimide was prepared as follows: A mixture of 7.4 grams of phthalic anhydride and 9.7 g. of 6-amino-1-hexyne was heated to 200° for ten minutes, cooled, and dissolved in chloroform. The chloroform solution was dried over magnesium sulfate, filtered and the solvent removed by vacuum distillation. The residual oil was distilled at 130–140°/0.001 mm. to yield 6.8 g. of crude solid product melting at 70–71°. On recrystallization from ethanol, the pure N-(5-hexynyl)phthalimide melted at 74–75°

*Analysis.*—Calc'd for $C_{14}H_{13}NO_2$: C, 73.99; H, 5.77; N, 6.16. Found: C, 73.16; H, 6.01; N, 6.28.

The synergistic activity of this compound was evaluated following the procedure described in Example 1. Typical results are shown in Table 4 below.

TABLE 4.—COMPOSITIONS OF N-(5-HEXYNYL)PHTHAL-IMIDE AND CHRYSANTHEMUMATES

| Chrysanthemumate | Mg. | Mg. Synergist | Mortality of houseflies, percent |
|---|---|---|---|
| Allethrin | 30 | 2,000 | 100 |
|  | None | 2,000 | 0 |
|  | 30 | 150 | 100 |
|  | None | 150 | 0 |
|  | 30 | None | 36 |
| Barthrin | 22 | 110 | 91 |
|  | None | 150 | 0 |
|  | 24 | None | 9 |

EXAMPLE 12

N-(6-heptynyl)phthalimide was prepared as follows: Equivalent amounts of 7-chloro-1-heptyne and potassium phthalimide were reacted, following the procedure described in Example 1. The product was recrystallized from ethanol-water, to yield pure N-(6-heptynyl)phthalimide, which melted at 81–82°

Analysis.—Calc'd for $C_{15}H_{15}NO_2$: C, 74.66; H, 6.27. Found: C, 62.88; H, 4.13.

EXAMPLE 13

3-chloro-N-(4-pentynyl)phthalimide was prepared as follows: A solution of 7.2 g. of 5-chloro-1-pentyne in 25 ml. of N,N-dimethylformamide was added dropwise to a stirred solution of 15 g. of potassium 3-chlorophthalimide in 225 ml. of N,N-dimethylformamide at 100°. The mixture was stirred for four hours at 100°, cooled to 70° and poured into one liter of ice water. The yellow precipitate was removed by filtration, washed twice with 200 ml. portions of water, and dried for four hours at 60° in a vacuum oven. Sixteen gras of crude product melting at 98–100° was obtained. On recrystallization from ethanol-water, the 3-chloro-N-(4-pentynyl) phthalimide melted at 102–3°

Analysis.—Calc'd for $C_{13}H_{10}ClNO_2$: C, 63.04; H, 4.07. Found: C, 62.88; H, 4.13

EXAMPLE 14

N-(1-methyl-4-pentynyl)phthalimide was prepared as follows: 1-methyl-4-pentynyl p-toluenesulfonate (17.7 g.) was added dropwise to a stirred solution of 13 g. of potassium phthalimide in 100 ml. of N,N-dimethylformamide at 60°. The mixture was stirred at 60° for twenty hours, then poured into one liter of ice water. An oil separated which crystallized on standing overnight. The crystals were separated by filtration, washed twice with 200 ml. portions of water and dried for four hours at 50° in a vacuum oven. The crude product (6.5 g.) melted at 55–7°. Recrystallization from ethanol-water gave 4.5 g. of pure N-(1-methyl-4-pentynyl)phthalimide, melting at 56–7°.

Analysis.—Calc'd for $C_{14}H_{13}NO_2$: C, 73.99; H, 5.77. Found: C, 73.76; H, 5.79.

EXAMPLES 15 TO 35

Following the same general procedures described and exemplified above, a large number of compounds of this class are readily synthesized. The synergistic insecticidal activity of representative phthalimides of the class described is exemplified in the results shown in Table 5:

TABLE 5.—SYNERGISTIC INSECTICIDAL COMPOSITIONS

| Chrysanthemumate | Mg. | Phthalimide | Mg. | Mortality of houseflies, percent |
|---|---|---|---|---|
| Furethrin | 22 | N-(6-heptynyl)- | 110 | 93 |
|  | None | Phthalimide. | 150 | 0 |
|  | 48 |  | None | 14 |
| Allethrin | 30 | ----do---------- | 150 | 100 |
|  | None |  | 150 | 0 |
|  | 30 |  | None | 30 |
| (1-cyclohexene-1,2-dicarboximido) methyl chrysanthemumate. | 22 | ----do---------- | 110 | 97 |
|  | None |  | 150 | 0 |
|  | 24 |  | None | 49 |
| Barthrin | 22 | ----do---------- | 110 | 74 |
|  | None |  | 150 | 0 |
|  | 24 |  | None | 9 |
| Allethrin | 30 | N-(7-octynyl)- phthalimide. | 150 | 97 |
|  | None |  | 150 | 0 |
|  | 30 |  | None | 21 |
| Cyclethrin | 14.4 | N-(9-decynyl)- phthalimide. | 72 | 84 |
|  | None |  | 150 | 0 |
|  | 24 |  | None | 21 |
| Pyrethrins | 14.4 | N-(10-undecynyl)- phthalimide. | 72 | 70 |
|  | None |  | 150 | 11 |
|  | 18 |  | None | 9 |
| Cyclethrin | 22 | 3-chloro-N-(4-pentynyl)- phthalimide. | 110 | 93 |
|  | None |  | 150 | 0 |
|  | 24 |  | None | 21 |
| (1-cyclohexene-1,2-dicarboximido) methyl chrysanthemumate. | 22 | ----do---------- | 110 | 94 |
|  | None |  | 150 | 0 |
|  | 24 |  | None | 49 |
| Allethrin | 30 | 4-chloro-N-(4-pentynyl)- phthalimide. | 150 | 97 |
|  | None |  | 150 | 0 |
|  | 30 |  | None | 51 |
| 3-(o-chlorobenzyl)-2-methyl-4-oxo-2-cyclopentenyl chrysanthemumate. | 50 | 3-chloro-N-(5-hexynyl)- phthalimide. | 250 | 100 |
|  | None |  | 2000 | 0 |
|  | 50 |  | None | 0 |
| Allethrin | 30 | 3-chloro-N-(6-heptynyl)- phthalimide. | 150 | 97 |
|  | None |  | 150 | 0 |
|  | 30 |  | None | 30 |
| Cyclethrin | 22 | 3-fluoro-N-(4-pentynyl)- phthalimide. | 110 | 96 |
|  | None |  | 150 | 13 |
|  | 24 |  | None | 21 |
| Phthalimidomethyl chrysanthemumate. | 50 | ----do---------- | 250 | 100 |
|  | None |  | 150 | 13 |
|  | 50 |  | None | 21 |
| Pyrethrins | 14.4 | 4-fluoro-N-(4-pentynyl)- phthalimide. | 72 | 90 |
|  | None |  | 150 | 6 |
|  | 18 |  | None | 9 |
| Dimethrin | 50 | 3-methyl-N-(4-pentynyl)- phthalimide. | 250 | 71 |
|  | None |  | 250 | 12 |
|  | 50 |  | None | 6 |
| Pyrethrins | 30 | 4-methyl-N-(4-pentynyl)- phthalimide. | 150 | 65 |
|  | None |  | 150 | 0 |
|  | 30 |  | None | 12 |
| 3,4-dimethylbenzyl chrysanthemumate. | 100 | ----do---------- | 500 | 46 |
|  | None |  | 2000 | 0 |
|  | 100 |  | None | 9 |
| 3-(o-chlorobenzyl)-2-methyl-4-oxo-2-cyclopentenyl chrysanthemumate. | 50 | N-(1-methyl-4-pentynyl)- phthalimide. | 250 | 100 |
|  | None |  | 250 | 6 |
|  | 50 |  | None | 0 |
| (1-cyclohexene-1,2-dicarboximido) methyl chrysanthemumate. | 20 | ----do---------- | 100 | 92 |
|  | None |  | 150 | 0 |
|  | 20 |  | None | 25 |
| Allethrin | 30 | ----do---------- | 150 | 100 |
|  | None |  | 150 | 0 |
|  | 30 |  | None | 51 |

The results in Table 5 show that the N-(omega-alkynyl) phthalimides are essentially non-toxic in themselves, and that they are effective synergists for an extremely wide variety of cyclopropanecarboxylic acid esters.

Further illustration of the synergistic effect of these compounds is seen in a comparison of the effectiveness of the phthalimide synergists of this invention with piperonyl butoxide as synergists for allethrin, as shown in the following example:

EXAMPLE 36

Relative effectiveness of synergistic compounds

The relative effectiveness of the phthalimides of this invention, in comparison with piperonyl butoxide, was determined as follows: One microliter of an acetone solution containing 1 part of allethrin to 5 parts of the test synergist was applied to each of a replicate of 35 to 45 three- to four-day-old houseflies. This test was performed at four different levels of concentration of allethrin and synergist. After twenty-four hours, the percent mortality at each concentration was determined by physical counting of the dead and living flies. A graph of percent mortality versus concentration was then plotted on logarithmic probability paper and the $LC_{50}$ (level of concentration to give fifty percent mortality) was read from this graph. A standard graph was determined concurrently using solutions of allethrin plus piperonyl butoxide at the same levels of concentration as those of the test compound. The $LC_{50}$ for allethrin plus piperonyl butoxide ($LC_{50}$ standard) was determined, and arbitrarily assigned a relative effectiveness of 1.00. The relative effectiveness of the test synergist was then determined from the equation:

Relative effectiveness =
$\dfrac{LC_{50} \text{ standard}}{LC_{50} \text{ test synergist}}$ Results are shown in Table 6.

TABLE 6

Relative effectiveness of representative phthalimides with piperonyl butoxide

| Synergist: | Relative effectiveness |
|---|---|
| Piperonyl butoxide | [1] 1.00 |
| N-(4-Pentynyl)phthalimide | 1.50 |
| N-(5-Hexynyl)phthalimide | 1.64 |
| N-(6-Heptynyl)phthalimide | 1.50 |

[1] Standard.

The above data show that each of the three phthalimides of this invention is 1.5 or more times as effective as piperonyl butoxide, as a synergist for allethrin. This represents a very useful improvement, which applies as well to the other phthalimides and cyclopropanecarboxylate insecticides described herein.

The novel synergistic compositions described herein are effective over a wide range of proportions of compounds, as will be discussed hereinafter. The following example illustrates this fact with the synergistic combination of (1 - cyclohexene-1,2 - dicarboximido)methyl chrysanthemumate and N-(4-pentynyl)phthalimide:

EXAMPLE 37

Following the test procedure described in Example 1, the insecticide (1-cyclohexene-1,2-dicarboximido)methyl chrysanthemumate and synergist N-(4-pentynyl)phthalimide were tested for activity against houseflies, in the proportions and concentrations and with the results shown in Table 7.

TABLE 7.—INSECTICIDAL ACTIVITY OF VARYING RATIOS OF COMPONENTS

| Mg. chrysanthemumate | Mg. phthalimide | Ratio | Mortality percent |
|---|---|---|---|
| 30 | None | | 32 |
| None | 30 | | 0 |
| None | 600 | | 2 |
| 30 | 30 | 1:1 | 69 |
| 30 | 60 | 1:2 | 97 |
| 30 | 150 | 1:5 | 100 |
| 30 | 300 | 1:10 | 100 |
| 30 | 600 | 1:20 | 100 |

As shown in Table 7, at even relatively low proportions of chrysanthemumate and phthalimide a marked synergistic effect is observed. With this particular combination of components the optimum ratio is shown to be between 1:2 and 1:5, and of course synergistic effectiveness is maintained at the higher ratios of phthalimide to chrysanthemumate. Note, however, that even 600 mg. of the phthalimide alone killed only 2% of the test insects.

In addition to the specific N-(omega-alkynyl)phthalimides exemplified herein, similar synergistic behavior characterizes the other members of the class described, including but not limited to the following: 3-bromo-N-(4-pentynyl)phthalimide, 4-chloro - N - (5 - hexynyl)phthalimide, N-(1-methyl-5-hexynyl)phthalimide, 3-chloro-N-(1-methyl-4-pentynyl)phthalimide, 4-fluoro - N - (1-methyl-4-pentynyl)phthalimide, 3-methoxy - N - (4-pentynyl) phthalimide, 4-acetoxy-N-(6-heptynyl)phthalimide, 4-cyano-N-(5-hexynyl)-phthalimide, 3-cyano-N-(1-methyl-4-pentynyl)phthalimide, N-(8-nonynyl)-phthalimide, 4-bromo-N-(6 - heptynyl)phthalimide, 3-(methoxycarbonyl)-N-(4 - pentynyl)phthalimide, 4 - methoxy-N-(5-hexynyl) phthalimide, 3-ethoxy - N - (4-pentynyl)phthalimide, 3-(methylthio)-N-(5 - hexynyl)phthalimide, 3-fluoro-N-(1-methyl-5-hexynyl)phthalimide, 3-methyl-N-(7 - octynyl) phthalimide, 4-chloro - N - (8-nonynyl)phthalimide, 3-fluoro-N-(10-undecynyl)phthalimide, 4-(ethylthio)-N-(4-pentynyl)phthalimide, 4 - (ethoxycarbonyl)-N-5-hexynyl) phthalimide, 3-acetoxy-N-(4 - pentynyl)phthalimide, 4-bromo-N-(1 - methyl - 4 - pentynyl)phthalimide, and 3-ethyl-N-(4-pentynyl)phthalimide.

The novel synergists described herein have a degree of effectiveness which is not shared by closely related compounds. The nature and location of the unsaturated linkage have been found to have a marked effect on the synergistic effectiveness of this type of compound. For example, reduction of the acetylenic linkage to an olefinic or a saturated linkage has the effect of diminishing the synergistic activity. Further, displacement of the acetylenic linkage from the terminal position also decreases the activity.

The synergistic compositions of this invention may be employed to control a variety of crop pests and household pests. Striking results are obtained when these compositions are applied as aerosol sprays, for example, or are formulated into any of the diluted and extended types of formulations used in insecticidal practice, including dusts, wettable powders, emulsifiable concentrates, solutions, granulars, baits, and the like, for application to foliage, within enclosed areas, to surfaces, and wherever insect control is desired.

These synergistic compositions may be made into liquid concentrates by solution or emulsification in suitable liquids, and into solid concentrates by admixing with talc, clays, and other known solid carriers used in the insecticide art. These concentrates are compositions which normally contain about 10–50% of toxicant and the rest inert material which includes dispersing agents, emulsifying agents, and wetting agents. The concentrates are diluted, for practical application, with water or other liquid for liquid sprays or with additional solid carrier for application as a dust or granular formulation. Baits are usually prepared by mixing such concentrates with a suitable food, such as a mixture of cornmeal and sugar. The concentration of the toxicant in the diluted formulations, as generally applied for control of insects, is normally in the range of about 2% to about 0.001%. Many variations of spraying and dusting compositions may be used, by substituting the compound of this invention into compositions known or apparent to the art.

Employing the synergistic insecticidal compositions described herein enhanced control is obtained of both crop and household pests, including insects against which the cyclopropanecarboxylates are themselves effective, albeit in higher concentrations. This includes flying and crawling pests of the classes of Coleoptera (bettles), Hemiptera (true bugs), Homoptera (aphids), Diptera (flies), Orthoptera (roaches), Acaridae (acarids), and Lepidoptera (butterflies and moths including their larvae). Because of the extremely low mammalian toxicity of these compositions, they are preferred compositions for use in control of pests in an environment inhabited by man and animals, including control of flies, mosquitoes, ants, roaches, moths, and the like, as well as in uses such as packaging, grain protection, and garden, pet, and livestock uses.

The relative amounts of synergist and cyclopropanecarboxylate employed are not critical, in that a relatively minor amount, e.g., less than one part of synergist per part of cyclopropanecarboxylate, is effective in imparting a beneficial effect to the combination. From practical considerations, it is preferred to use larger amounts of synergist, for example, for five to twenty or more parts of synergist per part of cyclopropanecarboxylate. Even larger proportions of synergist may be employed without detriment, whether or not the optimum synergistic proportions have been achieved. It is clear that effective amounts of synergist should be employed in the compositons, that the components should be present in synergistic proportions, and that effective amounts of the compositons, to control the particular insect pests, should be applied.

We claim:
1. Insecticidal composition comprising an insecticidal chrysanthemumate and, in synergistic proportions, a compound of the formula

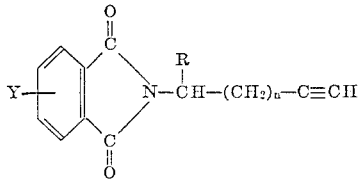

wherein $n$ is an integer from 2 to 8 inclusive, R is selected from the group consisting of hydrogen and methyl, and Y is selected from the group consisting of hydrogen, halogen, lower alkyl, lower alkoxy, lower alkylthio, cyano, acetoxy, methoxycarbonyl, and ethoxycarbonyl.

2. Insecticidal composition comprising an insecticidal chrysanthemumate and, a synergistic proportions, a compound of the formula

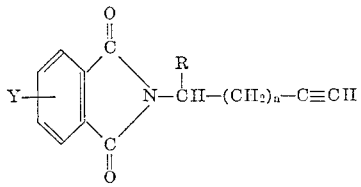

wherein $n$ is an integer from 2 to 4 inclusive, R is selected from the group consisting of hydrogen and methyl, and Y is selected from the group consisting of hydrogen, chlorine, and fluorine.

3. Insecticidal composition comprising an insecticidal chrysanthemumate and a compound of the formula

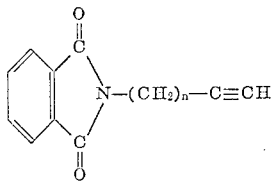

wherein $n$ is an integer of 3 to 9 inclusive wherein the ratio of said compound to said chrysanthemumate is in the range of 1:1 to 20:1.

4. Insecticidal composition according to claim 1, wherein said chrysanthemumate is allethrin.

5. Insecticidal composition according to claim 1, wherein said chrysanthemumate is pyrethrins.

6. Insecticidal composition according to claim 1, wherein said chrysanthemumate is (1-cyclohexene-1,2-dicarboximido)methyl chrysanthemumate.

7. Insecticidal composition comprising an insecticidal chrysanthemumate and N-(4-pentynyl)phthalimide wherein the ratio of said compound to said chrysanthemumate is in range of 1:1 to 20:1.

8. Insecticidal composition comprising an insecticidal chrysanthemumate and N-(5-hexynyl)phthalimide wherein the ratio of said compound to said chrysanthemumate is in the range of 1:1 to 20:1.

9. Insecticidal composition comprising an insecticidal chrysanthemumate and N-(6-heptynyl)phthalimide wherein the ratio of said compound to said chrysanthemumate is in the range of 1:1 to 20:1.

10. The method of controlling insect pests which comprises applying thereto an effective amount of a composition comprising an insecticidal chrysanthemumate and, in synergistic proportions, a compound of the formula

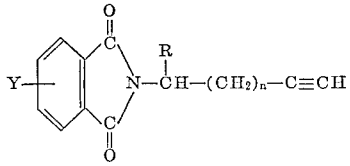

wherein $n$ is an integer from 8 to 8 inclusive, R is selected from the group consisting of hydrogen and methyl, and Y is selected from the group consisting of hydrogen, halogen, lower alkyl, lower alkoxy, lower alkylthio, cyano, acetoxy methoxycarbonyl, and ethoxycarbonyl.

11. The method of controlling insect pests which comprises applying thereto an effective amount of a composition comprising an insecticidal chrysanthemumate and, in synergistic proportions, a compound of the formula

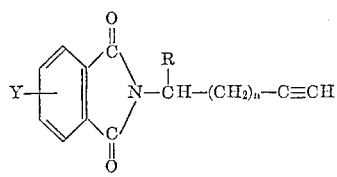

wherein $n$ is an integer from 2 to 4 inclusive, R is selected from the group consisting of hydrogen and methyl, and Y is selected from the group consisting of hydrogen, chlorine, and fluorine.

12. The method of controlling insect pests which comprises applying thereto an effective amount of a composition comprising an insecticidal chrysanthemumate and a compound of the formula

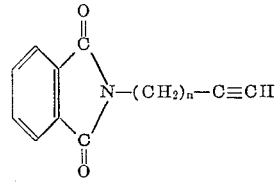

where $n$ is an integer of 3 to 9 inclusive wherein the ratio of said compound to said chrysanthemumate is in the range of 1:1 to 20:1.

References Cited

UNITED STATES PATENTS 3,337,560  8/1967  Biel _____ 260—326

OTHER REFERENCES

Cram et al. Organic Chemistry, New York, 1959, page 22.

Ettlinger et al. Jour. Amer. Chem. Soc., vol. 77, 1955, pages 1831–1835.

Gaudenmar, Annalaes de Chimie Ser. 13, T. 1, 1956, p. 172.

Elderfield, "Heterocyclic Compounds", vol. 3, pages 288–290.

King, Chemicals Evaluated As Insecticides and Repellents at Orlando, Fla. Agr. Handbook No. 69, 1954, pages 2–7, 46, 113–115 and 298.

ALBERT T. MYERS, Primary Examiner

STANLEY J. FRIEDMAN, Assistant Examiner

U.S. Cl. X.R.

260—326; 424—274, 282